United States Patent [19]

Childs

[11] 3,855,269

[45] Dec. 17, 1974

[54] APPARATUS AND METHOD FOR SEPARATING TETRAALKYLAMMONIUM SALT

[75] Inventor: William V. Childs, Bartlesville, Okla.

[73] Assignee: Phillips Petroleum Company, Bartlesville, Okla.

[22] Filed: July 27, 1972

[21] Appl. No.: 275,555

[52] U.S. Cl...... 260/465.9, 204/73 A, 260/465.8 A, 260/465.8 R, 260/567.6 M
[51] Int. Cl... C07c 121/32, B01k 1/00, C07c 85/16
[58] Field of Search............ 204/73 A; 260/465.8 A, 260/567.6 M, 465.9

[56] References Cited
UNITED STATES PATENTS

| | | | |
|---|---|---|---|
| 3,477,923 | 11/1969 | Beck et al. | 204/73 A |
| 3,489,789 | 1/1970 | Dewar et al. | 260/465.8 A |
| 3,523,967 | 8/1970 | Dewar et al. | 260/567.6 M X |
| 3,542,845 | 11/1970 | Diprose | 260/465.8 A |
| 3,630,861 | 12/1971 | Bizot et al. | 204/73 A |
| 3,660,258 | 5/1972 | Danley et al. | 204/73 A |

Primary Examiner—Joseph P. Brust

[57] ABSTRACT

Apparatus and method for separating tetraalkylammonium salt from a first stream comprising water, adiponitrile, dissolved tetraalkylammonium salts, and unconverted acrylonitrile by lowering the temperature of the first stream to a temperature in the range of about 50° to 70°F., separating an organic phase from the cooled first stream to form a second stream, chilling the second stream in a refrigeration zone to a temperature in the range of about 30° to about 50°F. and separating and recovering a tetraalkylammonium salt-containing aqueous phase therefrom.

6 Claims, 1 Drawing Figure

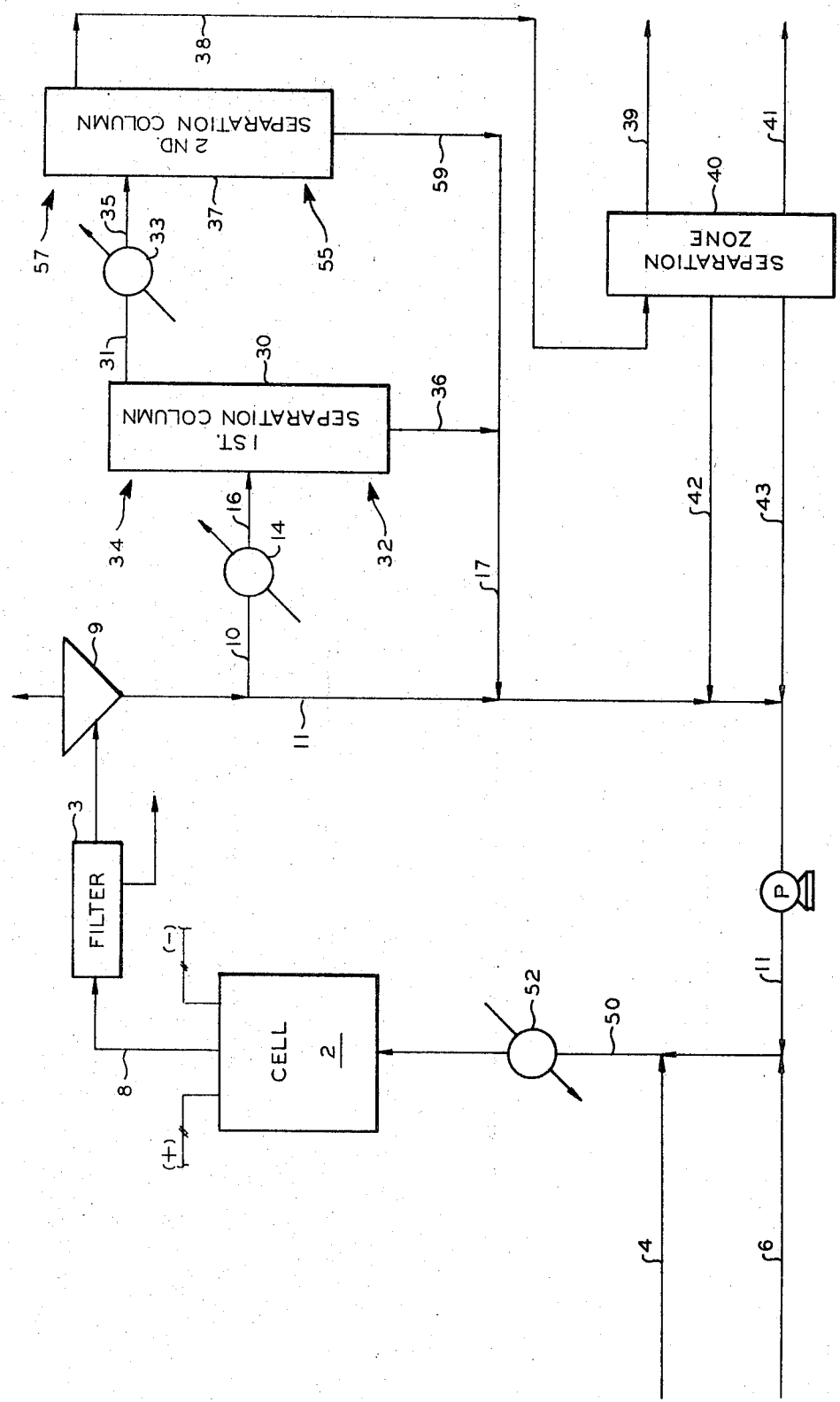

APPARATUS AND METHOD FOR SEPARATING TETRAALKYLAMMONIUM SALT

In an electrohydrodimerization process for converting acrylonitrile into adiponitrile which is a valuable precursor in the manufacture of nylon fibers, an aqueous electrolyte comprising a relatively large amount of conducting inorganic salt such as potassium phosphate and a small amount of a directing (catalytic) organic salt such as tetrabutylammonium phosphate, is continuously circulated between two suitable electrodes. Acrylonitrile is continuously added to this circulating system under conditions which provide an emulsion between the two electrodes.

At least a small amount of salts containing a tetraalkylammonium cation, such as tetrabutylammonium cation, is required to direct the reaction to the desired products. However, the organic nature of this cation imparts some solubility in organic liquids. Consequently, in the circulating emulsion system, the tetraalkylammonium salt distributes itself between the emulsified aqueous phase and the organic phase. The fact that the emulsion system contains a relatively large amount of purely inorganic salts contributes to a still greater concentration of the tetraalkylammonium ion in the organic phase by a "salting out" effect. Consequently, when the first stream containing the crude organic product is removed from the electrohydrodimerization cell, a portion of the tetraalkylammonium salt is also removed with it. Because this salt is a relatively costly material, some provision must be made to prevent the salt from being lost to the process.

Ordinarily, one might expect that a simple back-extraction of this crude organic product with water would be adequate to remove the tetraalkylammonium salt. However, efforts to remove the dissolved tetraalkylammonium salts from the organic phase by simple extraction with water were found to be only partially successful. The ordinarily highly extractable tetraalkylammonium salts were found to be only partially extractable when associated with the organic phase from the process effluent.

Even if the above method provided a means of recovery of all the tetraalkylammonium salts, it would involve several additional treating steps. I have now discovered a method in which the tetraalkylammonium salt is concentrated in the aqueous portion of the effluent and is directly recycled to the electrohydrodimerization process.

This problem has been solved by the process of the present invention. It has been found that chilling the emulsion removed from the electrohydrodimerization process has little effect on the distribution of the mildly water-soluble organics between the oil and aqueous phases, but it does concentrate most of the tetraalkylammonium salt in the aqueous phase as opposed to allowing a substantial quantity of the salt to leave the process in the organic phase. Further, the stream can be more economically cooled to the desired temperature by the method of this invention which reduces power and labor requirements, thereby avoiding waste.

This invention therefore resides in apparatus and method for separating tetraalkylammonium salt from a first stream comprising water, adiponitrile, dissolved tetraalkylammonium salts, and unconverted acrylonitrile discharging from an electrohydrodimerization cell, by lowering the temperature of the first stream to a temperature in the range of about 50° to 70°F. by water cooling said first stream for example, separating an organic phase from the cooled first stream to form a second stream, chilling the second stream in a refrigeration zone to a temperature in the range of about 30° to about 50°F. and separating and recovering a tetraalkylammonium salt-containing aqueous phase.

Other aspects, objects, and advantages of the present invention will become apparent from a study of the disclosure, the appended claims, and the drawing.

The drawing is a diagrammatic view of the apparatus of this invention.

Referring to the drawing, an electrohydrodimerization cell 2 is connected to means for controllably passing an acrylonitrile feed stream 4 and an aqueous make-up tetraalkylammonium salt stream 6 thereinto. An aqueous electrolyte comprising a relatively large amount of conducting inorganic salt such as potassium phosphate and a small amount of a directing (catalytic) organic salt such as tetrabutylammonium phosphate is circulated through the cell 2 which has two suitable electrodes. As electrolysis occurs, as known in the art, a stream 8 is removed from the cell zone, filtered at unit 3, degassed at unit 9, and a portion of the stream passing through line 11 is diverted through line 10 into a cooling zone 14 such as a heat exchanger for example. In the cooling zone 14, the temperature of the first stream 10 is lowered to a temperature in the range of about 50° to about 70°F.

The chilled first stream from cooling zone 14 is passed via line 16 into a separation zone 30 which has, respectively, lower and upper portions 32 and 34. In column 30, the first stream is separated, preferably by gravity settling, into a lower salt-containing aqueous phase which is discharged from portion 32 of the column 30 via lines 36 and 17 to rejoin the circulating emulsion stream in line 11, and an adiponitrile-containing product second stream which is discharged from portion 34 of the column 30 via line 31.

Line 31 is connected at its discharge end to a refrigeration zone 33 for delivering said cooled second stream thereinto at which location the temperature of said cooled second stream is chilled to a temperature in the range of about 30° to about 50°F.

The chilled second stream is passed from the refrigeration zone 33 via line 35 into a separation column 37 which has, respectively, lower and upper portions 55 and 57. In the separation column 37, the second stream is separated, preferably by gravity settling, into a lower salt-containing aqueous phase which is discharged from portion 55 of the column 37 via lines 59 and 17 to rejoin the circulating emulsion stream in line 11, and an adiponitrile-containing product stream which is discharged from portion 57 of the column 37 via line 38. A separation zone 40 is connected to line 38 for receiving the adiponitrile-containing product stream and separating the adiponitrile therefrom. Separation zone 40 can and generally will comprise more than one separation unit such as a series of fractionation units for the separation, isolation, and recovery of products. In addition to the distillation units, other units such as extraction units and absorption units can also be used.

Adiponitrile product leaves separation zone 40 through line 39 and other organic by-products such as propionitrile, and the like, leave separation zone 40 through line 41. Unconverted acrylonitrile is passed from separation zone 40 through line 42 to rejoin the recirculation emulsion stream in line 11. Similarly, recycle water and salts, if any, leave separation zone 40, pass through line 43, and also rejoin the recirculating emulsion in stream 11.

The recombined materials in line 11 are blended with fresh acrylonitrile through line 4 and make up water and salt through line 6, to form a mixture passing through line 50 and through heater 52 wherein the mixture is adjusted to the desired cell temperature, and then into cell zone 2.

In the method of this invention, a portion of the stream passing through line 11, which contains small amounts of dissolved organic and inorganic salts, is continuously diverted into cooling zone 14 via line 10. The effluent from any process employing an aqueous, an organic phase, and tetraalkylammonium phosphate salts and which has the proper solubility characteristics can be used, although processes utilizing an undivided cell and an emulsified recirculating reaction medium containing minor amounts of tetraalkylammonium phosphate salts and substantial amounts of alkali metal phosphate salts are presently most applicable.

The tetraalkylammonium phosphate salts which are particularly applicable to the present process are those wherein each alkyl group contains 1–20 carbon atoms and wherein the total number of all the carbon atoms in all the alkyl groups is 11–25. Some examples are tripropylbutylammonium phosphate, tetrabutylammonium phosphate, tributyloctylammonium phosphate, and the like, and mixtures thereof.

rated and recovered through line 41, unconverted acrylonitrile is separated and passed from the separation zone 40 and returned to the cell via lines 42 and 11, whereas recycle water and tetraalkylammonium salt pass from the separation zone 40 and return to the cell via lines 43 and 11.

The unexpected effect of chilling an emulsion containing tetraalkylammonium salts was demonstrated as follows:

EXAMPLE

In a process using apparatus and a sequence of steps similar to that of FIG. 1, acrylonitrile is continuously converted to adiponitrile. A brief summary of the essential conditions in the process is shown in Table I below.

Table I

| Emulsion temperature | 121°F |
| Electrodes | rectangular sections of 99.9% lead |
| Electrode gap | ⅛ inch |
| Velocity through gap | 3 ft./sec. |
| Volts across cell | 4.5 volts |
| Current density | 200 amp/ft.$^2$ |
| 1st Separation column temp. | 60°F |
| 2nd Separation column temp. | 35°F |

A typical distribution of components in the various streams of the process is shown in Table II. The stream numbers refer to the streams in FIG. 1.

Table II

| Stream No. | 4 | 6 | 10 | 17 | 31 | 38 | 39 | 41 | 42 | 43 | 59 |
|---|---|---|---|---|---|---|---|---|---|---|---|
| | | | | Stream Components (lb./hr.) | | | | | | | |
| Acrylonitrile | 85.5 | | 90.8 | 68.6 | 23.4 | 22.2 | | | 22.0 | | 1.2 |
| Adiponitrile | | | 160.6 | 87.2 | 77.4 | 73.4 | 73.0 | | | | 4.0 |
| Other Organics | | | 46.0 | 17.5 | 8.2 | 7.8 | | 7.7 | | | 0.4 |
| TBA$^+$ | | 0.1 | 8.8 | 9.5 | 1.5 | 0.2 | | | | 0.1 | 1.4 |
| Inorganic Salts | | 0.1 | 625.0 | 624.8 | 0.4 | 0.2 | | | | 0.1 | 0.2 |
| Water | | 16.8 | 4589.5 | 4590.9 | 8.9 | 2.9 | | | | 2.0 | 6.0 |

In cooling zone 14, the first stream is cooled to a temperature in the range of about 70°F. to about 50°F. for concentrating the tetraalkylammonium salts in the aqueous phase. This cooled first stream is then conducted to a separation zone 30 via line 16.

In the separation column 30, an organic phase is separated thereby forming a second stream which is removed from an upper portion of the column 30 via line 31. The second stream passes into a refrigeration zone 33, is chilled to a temperature in the range of about 30° to about 50°F., and delivered into a second separation column 37.

In the second separation column 37, the second stream is separated, preferably by gravity settling, into a lower salt-containing second aqueous phase which is passed via lines 59 and 17 to the circulating emulsion stream in line 11.

A solution of essentially salt-free adiponitrile and organic byproducts is removed from upper portion 57 of separation zone 37 through line 38. Line 38 leads to separation zone 40 for separation and recovery of adiponitrile product.

Adiponitrile product is separated and recovered through line 39, other organic by-products are sepa- Other modifications and alterations of this invention will become apparent to those skilled in the art from the foregoing discussion, example, and accompanying drawing, and it should be understood that this invention is not to be unduly limited thereto.

What is claimed is:

1. A method for separating tetraalkylammonium salts from a stream in the form of an emulsion, said emulsion stream being a product of an electrohydrodimerization process for converting acrylonitrile into adiponitrile, said emulsion stream consisting essentially of adiponitrile, acrylonitrile, other organics, inorganic salts, water and a small amount of a dissolved catalytic tetraalkylammonium salt, said method comprising:

passing said emulsion stream through a cooling zone and thus lowering the temperature thereof to a temperature in the range of about 70° to 50°F;

separating said first stream into a first organic phase stream and a first aqueous phase stream;

recovering said first aqueous phase;

passing said thus separated first organic phase stream through a refrigeration zone and thus lowering the temperature thereof to a temperature in the range of about 30° to 50°F;

separating said first organic phase stream into a second organic phase stream and a second aqueous phase stream containing a portion of said tetraalkylammonium salt; and recovering said second aqueous phase.

2. A method according to claim 1 including in addition passing said second organic phase stream containing acrylonitrile, adiponitrile, and a small amount of water to a separation zone and separating an acrylonitrile stream and a water stream therefrom.

3. A method according to claim 1 wherein said tetraalkylammonium salt is a tetraalkylammonium phosphate wherein each alkyl group contains 1 to 20 carbon atoms and wherein the total number of all the carbon atoms in all the alkyl groups is 11 to 25.

4. A method according to claim 1 wherein said tetraalkylammonium salt is selected from the group consisting of tripropylbutylammonium phosphate, tetrabutylammonium phosphate, and tributyloctylammonium phosphate.

5. A method according to claim 1 wherein said tetraalkylammonium salt is tetrabutylammonium phosphate.

6. A method according to claim 1 wherein said emulsion stream is cooled in said cooling zone by means of a water cooled heat exchanger.

* * * * *